United States Patent Office 3,321,458
Patented May 23, 1967

3,321,458
WATER-INSOLUBLE MONOAZO-DYESTUFFS
Konrad Löhe, Offenbach (Main), and Joachim Ribka, Offenbach-Burgel, Germany, assignors to Farbwerke Hoechst Aktiengesellschaft vormals Meister Lucius & Bruning, Frankfurt am Main, Germany, a corporation of Germany
No Drawing. Filed Dec. 26, 1962, Ser. No. 247,298
Claims priority, application Germany, Dec. 29, 1961, F 35,682
4 Claims. (Cl. 260—203)

The present invention relates to valuable, water-insoluble monoazo-dyestuffs and a process for their manufacture; more particularly it relates to a process wherein the diazonium compounds of amines having the general formula

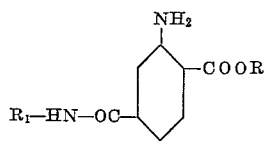

in which R represents a lower alkyl radical and $R_1$ represents a lower alkyl or aryl radicals, are coupled with coupling components which are free from sulfonic acid and carboxylic acid groups and which are capable of coupling in a position vicinal to a hydroxyl group.

We have found that valuable, water insoluble monoazo-dyestuffs are are obtained by coupling the diazonium compounds of amines having the general formula

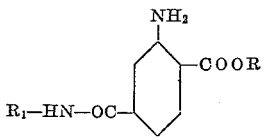

in which R represents a lower alkyl radical and $R_1$ represents a lower alkyl or aryl radical with coupling components which are free from sulfonic acid and carboxylic acid groups and which are capable of coupling in a position vicinal to a hydroxyl group.

The diazo-components used in the process of the present invention can be prepared, for example by saponifying the 1-nitrobenzene-2,5-dicarboxylic acid diester to form the 1-nitrobenzene-2-carboxylic acid ester-5-carboxylic acid, by converting this compound into the 1-nitrobenzene-2-carboxylic acid ester-5-carboxylic acid chloride, by reacting the carboxylic acid chloride with aliphatic or aromatic amines to form the corresponding 1-nitrobenzene-2-carboxylic acid ester-5-carboxylic acid alkylamides or arylides and by subsequent reduction to form the 1-aminobenzene-2-carboxylic acid ester-5-carboxylic acid alkylamides or arylides. As aliphatic or aromatic amines suitable for the conversion with the 1-nitrobenzene-2-carboxylic acid ester-5-carboxylic acid chlorides there may be used, for example, methylamine, ethylamine, propylamine, butylamine or aniline, which may contain in the benzene nucleus one or more alkyl or alkoxy groups or halogen atoms, and 1- or 2-aminonaphthalene or 4-aminodiphenyl.

The preparation of the diazonium compounds from the amines is carried out in known manner. In some cases the diazonium compounds are difficulty soluble in an aqueous medium and separate in the form of their salts. They may be isolated and used in the form of a moist paste. The diazotization may, however, also be carried out in a suitable organic solvent, for example in glacial acetic acid, acetone, dioxane, tetrahydrofurane, formamide, dimethylformamide or dimethylsulfoxide, and the solution of the diazonium compound so obtainable may be used.

As coupling components there may be used in the process of the present invention compounds capable of coupling in a position vicinal to a hydroxyl group, i.e. aromatic or heterocyclic hydroxyl compounds and compounds containing an enolizable or enolized keto-methylene group in an open carbon chain or in a heterocyclic ring. Such compounds are for example, 2-hydroxynaphthalene, 2,3-hydroxynaphthoic acid amide, 2,3-hydroxynaphthoic acid alkylamides or arylides of 2,3-hydroxynaphthoic acid or of acylacetic acids. The arylamide radical may contain one or more substituents which do not impart solubility in water, for example halogen atoms, alkyl, alkoxy, acyloxy, acylamino, arylsulfonylamino, alkylsulfonylamino, trifluoromethyl, nitro, acyl, alkylsulfone, arylsulfone, cyano, carboxylic acid amide, carboxylic acid ester, sulfonic acid amide, sulfonic acid ester or hydroxyl groups. Furthermore, there may be used as coupling components derivatives of 5-pyrazolone, such as, for example, 1-aryl-3-methyl-5-pyrazolones, 1-aryl-5-pyrazolone-3-carboxylic acid esters or 1-aryl-5-pyrazolone-3-carboxylic acid amides which may contain in the aryl radical one or more of the above-mentioned substituents which do not impart solubility in water, as well as 2,4-dihydroxyquinoline or derivatives of barbituric acid.

The preparation of the novel dyestuffs is carried out by methods in themselves known, for example by coupling the diazonium compounds with the coupling components in an aqueous medium, advantageously in the presence of a non-ionic, anino-active or cation-active dispersing agent, or in the presence of an organic solvent. In order to obtain the azo-dyestuffs in a favorable granular condition, it is expedient in some cases to add resin soap to the aqueous reaction mixture after the coupling operation and/or to heat the mixture, for example, to heat it to the boil for some time or to mix for some time—if desired while heating—the isolated moist or dried dyestuff in a suitable organic solvent, for example, in pyridine, glacial acetic acid, dimethylformamide, ethyl alcohol or glycolmonoethyl ether.

The dyestuffs obtainable in the process of the invention are water-insoluble pigments which are distinguished by their good fastness to light and to solvents. They are suitable for the preparation of colored lacquers or lake formers, of colored solutions and products of acetyl-cellulose, nitro-cellulose, natural or artificial resins, such as polymerization or condensation resins, for example aminoplasts or phenoplasts, furthermore polystyrene, polyolefins, for example polyethylene or polypropylene, polyacryl compounds, polyvinyl compounds such, for example, as polyvinyl chloride or polyvinyl acetate, polyesters, casein resins or silicone resins.

Furthermore, the novel dyestuffs are suitable for pigment printing on a substratum, especially on textile fibres, as well as on other flat structures, such as paper. They may also be used for other purposes, for example, in a finely divided form for dyeing viscose rayon or cellulose ethers or esters, polyamides or polyurethanes in the spinning solution or for coloring paper. The novel dyestuffs can be prepared likewise by carrying out the coupling on the fibers. On vegetable fibers—inclusively those of regenerated cellulose—there are obtained dyeings which are distinguished by their good fastness to light and to solvents.

The following examples illustrate the invention, but they are not intended to limit it thereto, the parts being by weight unless otherwise stated and the relationship of parts by weight to parts by volume being the same as that of the kilogram to the liter.

EXAMPLE 1

13.3 parts of 1-aminobenzene-2-carboxylic acid methylester-5-carboxylic acid phenylamide are stirred in 300 parts by volume of glacial acetic acid and 30 parts by volume of 5 N-hydrochloric acid and diazotized by the addition of 10 parts by volume of 5 N-sodium nitrite solution. The diazo solution obtained is diluted by the addition of ice and water, clarified and combined at 70° C. with an aqueous suspension of 19.7 parts of 1-(2',3'-hydroxynaphthoylamino) - 4 - benzoyl-aminobenzene, which had been prepared by dissolving this compound in dilute sodium hydroxide solution and precipitating it with glacial acetic acid in the presence of a reaction product of about 20 mols of ethylene oxide and 1 mol of octadecyl alcohol. The simultaneous introduction of dilute sodium hydroxide solution provides that during the coupling the reaction mixture still contains a small amount of acetic acid. When the coupling is complete, the whole is stirred for 1 hour and then boiled for 1 hour. It is advantageous to add after the coupling an aqueous solution of 2 parts of resin soap to the dyestuff. The dyestuff formed is filtered off by suction, washed and dried. There is obtained a red dyestuff having the formula

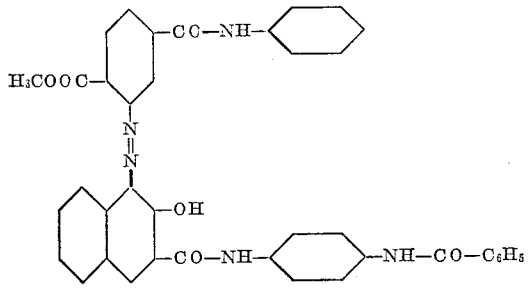

The scarlet dyeings prepared with these dyestuffs show in the different working media, such as lacquers, printing inks and plastics, a good fastness to solvents.

EXAMPLE 2

10.4 parts of 1-aminobenzene-2-carboxylic acid methyl ester-5-carboxylic acid methylamide are stirred for 30 minutes together with 40 parts by volume of 5 N-hydrochloric acid. The mixture is then diluted with water and diazotized at 10° C. with 10 parts by volume of 5 N-sodium nitrite solution. The clarified diazo solution is run at about 20° C. into an aqueous suspension of 15.4 parts of 1-acetoacetylamino-2-methoxy-4-acetylamino-5-chlorobenzene, which had been prepared by dissolving this compound in dilute sodium hydroxide solution and precipitating it with glacial acetic acid in the presence of a reaction product of about 20 mols of ethylene oxide and 1 mol of octadecyl alcohol. During the coupling a dilute soduim acetate solution is run into the coupling mixture simultaneously with the diazo solution in order to avoid that the acidity increases. Subsequently the mixture is after-stirred for 1 hour, the dyestuff formed is filtered off with suction, washed with water and the moist dyestuff cake is stirred for 1 hour at about 90° C. with about 350 parts by volume of glacial acetic acid. The dyestuff is then filtered off with suction, washed thoroughly with water and dried. There is obtained a yellow dyestuff having the formula

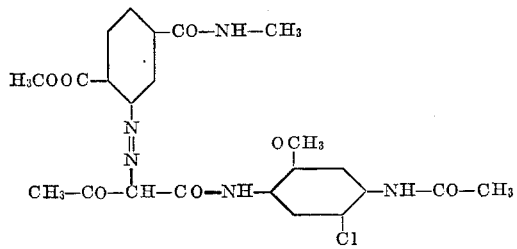

By incorporating the dyestuff in polyvinyl chloride, a lacquer or a printing ink, there are obtained yellow dyeings which possess a good fastness to light and to solvents.

EXAMPLE 3

13.3 parts of 1-aminobenzene-2-carboxylic acid methyl ester-5-carboxylic acid phenylamide are stirred for a few hours with 40 parts by volume of 5 N-hydrochloric acid until the hydrochloride of the amine has formed. Subsequently the mixture is diluted with water up to 1500 parts by volume and diazotized with 10 parts by volume of 5 N-sodium nitrite solution. The clarified diazo solution is run into a solution of 15.8 parts of 1-(2',3'-hydroxynaphtholamino)-4-ethoxybenzene in 500 parts by volume of pyridine while stirring. When the coupling is complete, the dyestuff formed is filtered off with suction, washed and dried. There is obtained a dyestuff having the formula

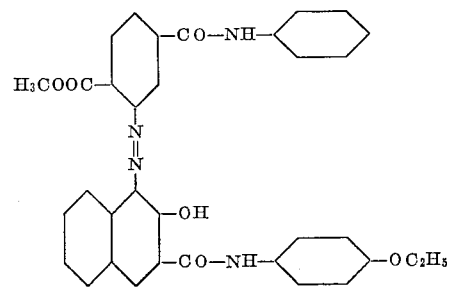

which—when incorporated in a printing paste—yields red dyeings possessing a good fastness to light and to solvents.

EXAMPLE 4

Cotton yarn is treated for 45 minutes at 35° C. at a goods-to-liquor ratio of 1:20 in the impregnating bath described hereafter, centrifuged and subsequently developed for 30 minutes at 20° C. in the developing bath described below. The material is then rinsed with 3 cc. of hydrochloric acid of 20° Bé. per liter of water, soaped first for 15 minutes at 60° C., then for 15 minutes at 95° C. with 1 g. of a product obtained by the reaction of about 10 mols of ethylene oxide and 1 mol of isododecylphenol and 3 g. of calcined soda per liter of water, rinsed and dried.

*Impregnating bath*

1.75 g. of 2-(2',3'-hydroxynaphthoylamino)-naphthalene are dissolved in 3.5 cc. of denatured ethyl alcohol, 0.9 cc. of sodium hydroxide solution of 38° Bé., 1.8 cc. of water of 40° C. and 0.9 cc. of formaldehyde solution of 33 percent strength. The solution thus obtained is made up to 1 liter with water of 35° C., 3 g. of a condensation product of fatty acids and protein products of high molecular weight and 10 cc. of sodium hydroxide solution of 38° Bé.

*Developing bath*

3.4 g. of 1-aminobenzene-2-carboxylic acid methylester-5-carboxylic acid-(2',5'-dichloro)-phenylamide are diazotized at a ratio of 1.5 with 4cc. of hydrochloric acid of 20° Bé. and 4 cc. of sodium nitrite solution. The diazo solution thus obtained is introduced into a bath containing per liter of water 2 g. of a product obtained by the reaction of about 20 mols of ethylene oxide and 1 mol of octadecyl alcohol and 3.5 g. of sodium acetate.

The following table contains a number of further components which may be used in the process of the present invention as well as the tints of the graphic prints obtained with these dyestuffs.

| Diazo Component | Coupling Component | Tint |
|---|---|---|
| 1-aminobenzene-2-carboxylic acid methyl ester-5-carboxylic acid methylamide. | 1-(2',3'-hydroxynaphthoylamino)-4-methoxybenzene. | Red. |
| Do | 1-(2',3'-hydroxynaphthoylamino)-4-ethoxybenzene. | Red. |
| Do | 1-(2',3'-hydroxynaphthoylamino)-2-methylbenzene. | Red. |
| Do | 1-(2',3'-hydroxynaphthoylamino)-4-benzoylaminobenzene. | Red. |
| Do | 1-acetoacetylamino-2,5-dimethoxy-4-chlorobenzene. | Yellow. |
| Do | 1-acetoacetylamino-4-acetylaminobenzene | Do. |
| 1-aminobenzene-2-carboxylic acid ethyl ester-5-carboxylic acid methylamide. | ----do---- | Do. |
| 1-aminobenzene-2-carboxylic acid-n-propylester-5-carboxylic acid methylamide. | ----do---- | Do. |
| 1-aminobenzene-2-carboxylic acid methyl ester-5-carboxylic acid ethylamide. | 1-acetoacetylamino-2-methoxy-4-acetylamino-5-chlorobenzene. | Do. |
| 1-aminobenzene-2-carboxylic acid methyl ester-5-carboxylic acid phenylamide. | 1-(2',3'-hydroxynaphthoylamino)-4-methoxybenzene. | Red. |
| Do | 1-(2',3'-hydroxynaphthoylamino)-2-methylbenzene. | Red. |
| Do | 1-(2',3'-hydroxynaphthoylamino)-2-methoxybenzene. | Red. |
| Do | 2,3-hydroxynaphthoylaminobenzene | Red. |
| Do | 1-(2',3'-hydroxynaphthoylamino)-2-methoxy-5-chlorobenzene. | Red. |
| Do | 1-(2',3'-hydroxynaphthoylamino)-2-methyl-5-chlorobenzene. | Red. |
| Do | 1-(2',3'-hydroxynaphthoylamino)-2-methyl-4-chlorobenzene. | Red. |
| Do | 1-(2',3'-hydroxynaphthoylamino)-2,4-dimethoxy-5-chlorobenzene. | Red. |
| Do | 1-(2',3'-hydroxynaphthoylamino)-2-methyl-4-benzoylaminobenzene. | Red. |
| Do | 1-(2',3'-hydroxynaphthoylamino)-3-methyl-4-benzoylaminobenzene. | Red. |
| Do | 1-(2',3'-hydroxynaphthoylamino)-3-chloro-4-benzoylaminobenzene. | Red. |
| Do | 1-(2',3'-hydroxynaphthoylamino)-2,5-dimethyl-4-benzoylaminobenzene. | Red. |
| Do | 1-(2',3'-hydroxynaphthoylamino)-2-chloro-4-benzoylamino-5-methylbenzene. | Red. |
| Do | 1-(2',3'-hydroxynaphthoylamino)-2-methoxy-4-benzoylamino-5-chlorobenzene. | Red. |
| Do | 2-(2',3'-hydroxynaphthoylamino)-naphthalene. | Red. |
| Do | 1-(2',3'-hydroxynaphthoylamino)-3-nitrobenzene. | Red. |
| Do | 1-(2',3'-hydroxynaphthoylamino)-benzene-4-carboxylic acid amide. | Red. |
| Do | 1-(2',3'-hydroxynaphthoylamino)-2-methoxybenzene-5-carboxylic acid amide. | Red. |
| Do | 1-(2',3'-hydroxynaphthoylamino)-benzene-4-sulfonic acid amide. | Red. |
| Do | 1-acetoacetylamino-2,5-dimethoxy-4-chlorobenzene. | Yellow. |
| Do | 1-acetoacetylamino-2,5-dimethoxybenzene | Do. |
| Do | 1-acetoacetylamino-2,4-dimethoxy-5-chlorobenzene. | Do. |
| Do | 1-acetoacetylamino-2,4-dimethoxybenzene | Do. |
| Do | 1-acetoacetylamino-4-acetylaminobenzene | Do. |
| Do | 1-acetoacetylamino-2-methoxy-4-acetylaminobenzene. | Do. |
| Do | 1-acetoacetylamino-2-methoxy-4-acetylamino-5-chlorobenzene. | Do. |
| Do | 1-acetoacetylaminonaphthalene | Do. |
| Do | 1-phenyl-3-methyl-5-pyrazolone | Do. |
| 1-aminobenzene-2-carboxylic acid methyl ester-5-carboxylic acid-(3'-chloro)-phenylamide. | 1-(2',3'-hydroxynaphtholyamino)-4-methoxybenzene. | Red. |
| Do | 1-(2',3'-hydroxynaphtholyamino)-4-benzoylaminobenzene. | Red. |
| Do | 1-(2',3'-hydroxynaphtholyamino)-3-methyl-4-benzoylaminobenzene. | Red. |
| Do | 1-acetoacetylamino-2-methoxy-4-acetylamino-5-chlorobenzene. | Yellow. |
| Do | 1-acetoacetylamino-4-acetylaminobenzene | Do. |
| 1-aminobenzene-2-carboxylic acid methyl ester-5-carboxylic acid-(4'-methyl)-phenylamide. | 1-(2',3'-hydroxynaphthoylamino)-4-benzoylaminobenzene. | Red. |
| Do | 1-(2',3'-hydroxynaphthoylamino)-3-chloro-4-benzoylaminobenzene. | Red. |
| 1-aminobenzene-2-carboxylic acid methyl ester-5-carboxylic acid-(2'-methyl-3'-chloro)-phenylamide. | 1-(2',3'-hydroxynaphthoylamino)-2,5-dimethyl-4-benzoylaminobenzene. | Red. |
| Do | 1-(2',3'-hydroxynaphthoylamino)-4-benzoylaminobenzene. | Red. |
| Do | 1-acetoacetylamino-2-methoxy-4-acetylamino-5-chlorobenzene. | Yellow. |
| 1-aminobenzene-2-carboxylic acid methyl ester-5-carboxylic acid-(2',5'-di-chloro)-phenylamide. | 1-(2',3'-hydroxynaphthoyl-amino)-4-methoxybenzene. | Red. |
| Do | 1-(2',3'-hydroxynaphthoyl-amino)-4-benzoylamino-benzene. | Do. |
| Do | 1-acetoacetylamino-2,5-dimethoxy-4-chlorobenzene. | Yellow. |
| 1-aminobenzene-2-carboxylic acid methyl ester-5-carboxylic acid-1'-naphtylamide. | 1-acetoacetylamino-4-acetylaminobenzene | Do. |
| 1-aminobenzene-2-carboxylic acid methyl ester-5-carboxylic acid methylamide. | 1'(2',3'-hydroxynaphthoyl-amino)-2-methoxybenzene. | Yellowish red. |
| Do | 1-(2',3'-hydroxynaphthoyl-amino)-2,4-dimethylbenzene. | Do. |
| 1-aminobenzene-2-carboxylic acid methyl ester-5-carboxylic acid-(3'-chloro)-phenylamide. | 1-(2',3'-hydroxynaphthoyl-amino)-2-ethoxybenzene. | Do. |
| 1-aminobenzene-2-carboxylic acid methyl ester-5-carboxylic acid-(2',5'-di-chloro)-phenylamide. | 1-(2',3'-hydroxynaphthoyl-amino)-2-methoxybenzene. | Do. |
| Do | 1-(2',3'-hydroxynaphthoyl-amino)-2-methoxy-5-chlorobenzene. | Red. |
| Do | 1-(2',3'-hydroxynaphthoyl-amino)-2-methylbenzene. | Yellowish red. |

| Diazo Component | Coupling Component | Tint |
|---|---|---|
| 1-aminobenzene-2-carboxylic acid methyl ester-5-carboxylic acid-(2'-methoxy-5'-chloro)-phenylamide. | 1-(2',3'-hydroxynaphthoyl-amino)-2-methoxybenzene. | Do. |
| 1-aminobenzene-2-carboxylic acid methyl ester-5-carboxylic acid-(4'-methoxy)-phenylamide. | 1-(2',3'-hydroxynaphthoyl-amino)-4-benzoylamino-benzene. | Red. |
| 1-aminobenzene-2-carboxylic acid methyl ester-5-carboxylic acid-(3',4'-di-chloro)-phenylamide. | 1-(2',3'-hydroxynaphthoyl-amino)-2-methoxybenzene. | Yellowish red. |
| 1-aminobenzene-2-carboxylic acid methyl ester-5-carboxylic acid-(2',4'-di-chloro)-phenylamide. | ----do---- | Do. |
| 1-aminobenzene-2-carboxylic acid methyl ester 5-carboxylic acid-(2',4',5'-trichloro)-phenylamide. | 1-(2',3'-hydroxynaphthoylamino)-4-methoxybenzene. | Do. |
| 1-aminobenzene-2-carboxylic acid methyl ester-5-carboxylic acid-(2',5'-dimethyl)-phenylamide. | 1-acetoacetylamino-4-acetylaminobenzene. | Greenish yellow. |
| 1-aminobenzene-2-carboxylic acid methyl ester-5-carboxylic acid-(4'-ethoxy)-phenylamide. | ----do---- | Do. |
| 1-aminobenzene-2-carboxylic acid methyl ester-5-carboxylic acid-(4'-ethyl)-phenylamide. | ----do---- | Do. |
| 1-aminobenzene-2-carboxylic acid methyl ester-5-carboxylic acid-(2',4'-dimethoxy-5'-chloro)-phenylamide. | ----do---- | Do. |
| 1-aminobenzene-2-carboxylic acid methyl ester-5-carboxylic acid-(2'-chloro-5'-trifluoromethyl)-phenylamide. | 1-(2',3'-hydroxynaphthoyl-amino)-4-benzoyl-aminobenzene. | Red. |
| 1-aminobenzene-2-carboxylic acid methyl ester-5-carboxylic acid-(2'-methyl-4'-methoxy)-phenylamide. | ----do---- | Red. |
| 1-aminobenzene-2-carboxylic acid methyl ester 5-carboxylic acid-(2'-methoxy-4'-chloro-5'-methyl)-phenylamide. | ----do---- | Red. |
| 1-aminobenzene-2-carboxylic acid ethyl ester-5-carboxylic acid-(2',5'-dichloro)-phenylamide. | 1-(2',3'-hydroxynaphthoyl-amino)-2-methoxybenzene. | Red. |
| 1-aminobenzene-2-carboxylic acid methyl ester-5-carboxylic acid-(2',5'-dichloro)-phenylamide. | 1-(2',3'-hydroxynaphthoyl-amino)-2-ethoxybenzene. | Red. |

We claim:
1. The water-insoluble monoazo-dyestuff having the formula

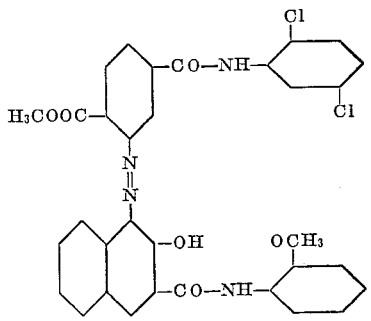

2. The water-insoluble monoazo-dyestuff having the formula

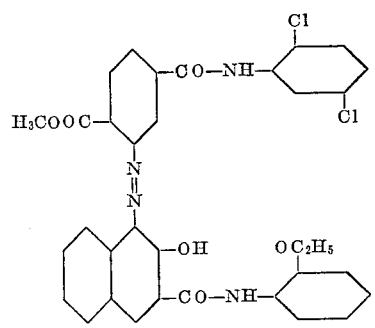

3. The water-insoluble monoazo-dyestuff having the formula

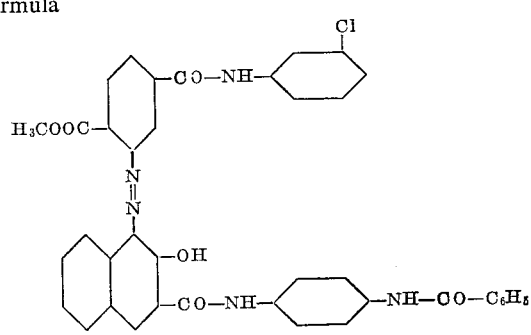

4. The water-insoluble monoazo dyestuff having the formula

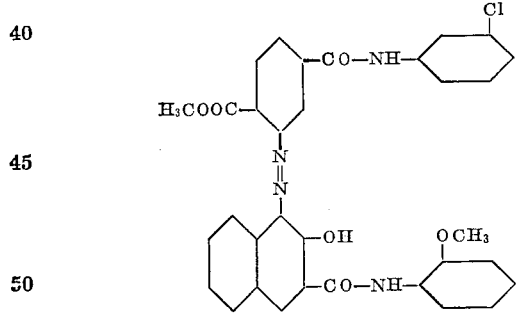

References Cited by the Examiner

UNITED STATES PATENTS

| 2,703,319 | 3/1955 | Fischer | 260—151 X |
| 3,096,321 | 7/1963 | Ribka | 260—193 |
| 3,113,938 | 12/1963 | Nakaten et al. | 260—204 |
| 3,157,632 | 11/1964 | Ribka | 260—193 |

FOREIGN PATENTS 1,047,965   12/1958   Germany.

CHARLES B. PARKER, *Primary Examiner.*

IRVING MARCUS, *Examiner.*

N. S. MILESTONE, R. J. FINNEGAN, D. M. PAPUGA,
*Assistant Examiners.*